US012594834B2

(12) United States Patent
Randall et al.

(10) Patent No.: US 12,594,834 B2
(45) Date of Patent: Apr. 7, 2026

(54) TEMPERATURE BASED RESISTIVE BRAKING CAPACITY

(71) Applicant: Caterpillar Inc., Peoria, IL (US)

(72) Inventors: Jacob Dean Randall, Peoria, IL (US); Dennis Christopher Agee, Newark, TX (US)

(73) Assignee: Caterpillar Inc., Peoria, IL (US)

( * ) Notice: Subject to any disclaimer, the term of this patent is extended or adjusted under 35 U.S.C. 154(b) by 128 days.

(21) Appl. No.: 18/514,655

(22) Filed: Nov. 20, 2023

(65) Prior Publication Data

US 2025/0162414 A1 May 22, 2025

(51) Int. Cl.
| | |
|---|---|
| *B60K 35/28* | (2024.01) |
| *B60L 7/02* | (2006.01) |
| *G06T 11/00* | (2006.01) |
| *G06T 11/20* | (2006.01) |

(52) U.S. Cl.
CPC ............... *B60K 35/28* (2024.01); *B60L 7/02* (2013.01); *G06T 11/001* (2013.01); *G06T 11/206* (2013.01); *B60K 2360/167* (2024.01); *B60K 2360/168* (2024.01); *B60L 2200/40* (2013.01); *B60L 2240/36* (2013.01)

(58) Field of Classification Search
CPC .............. B60K 35/28; B60K 2360/167; B60K 2360/168; B60L 7/02; B60L 2200/40; B60L 2240/36; B60L 2250/16; B60L 7/06; B60L 7/22; G06T 11/001; G06T 11/206; H02P 23/14; H02P 29/68
See application file for complete search history.

(56) References Cited

U.S. PATENT DOCUMENTS

| | | |
|---|---|---|
| 7,011,186 B2 | 3/2006 | Frentz et al. |
| 7,262,571 B2 | 8/2007 | Nelson et al. |
| | (Continued) | |

FOREIGN PATENT DOCUMENTS

| | | |
|---|---|---|
| CN | 113460020 B | 12/2022 |
| EP | 3358729 B1 | 7/2022 |

OTHER PUBLICATIONS

Written Opinion and International Search Report for Int'l. Patent Appln. No. PCT/US2024/051690, mailed Dec. 13, 2024 (13 pgs).

*Primary Examiner* — Jeffery A Brier
(74) *Attorney, Agent, or Firm* — Foley & Lardner LLP (Dallas)

(57) ABSTRACT

Provided herein is a system including a resistor grid comprising a plurality of resistor elements, the resistor grid electrically coupled to a motor of an electric drive machine; a temperature sensor arranged to measure a temperature of at least one of the plurality of resistor elements; a control circuit comprising one or more processors and memory structured to store instructions that, when executed by the one or more processors, cause the control circuit to: determine a temperature of the least one resistor element, according to measurements from the temperature sensor; and determine a resistive braking capacity of the resistor grid within a power capacity differential, according to the determined temperature of the resistor element; and a display configured to render a graphical representation of the resistive braking capacity of the resistor grid relative to the power capacity differential.

22 Claims, 9 Drawing Sheets

(56)          References Cited

U.S. PATENT DOCUMENTS

| | | | |
|---|---|---|---|
| 2013/0082045 A1* | 4/2013 | Mazumdar | B60L 3/0069 |
| | | | 219/494 |
| 2019/0315231 A1 | 10/2019 | Widmer et al. | |
| 2022/0332194 A1 | 10/2022 | Lindberg | |
| 2023/0203784 A1* | 6/2023 | Arai | E02F 9/207 |
| | | | 701/50 |

* cited by examiner

111

400

310

302

306

304

308

TEMPERATURE BASED RESISTIVE BRAKING CAPACITY

TECHNICAL FIELD

The present disclosure relates generally to the field of a resistor grid assembly for a resistive braking system for an electric drive machine, and more particularly to improved systems and methods of operating such resistor grid assemblies.

BACKGROUND

Resistor grid systems used for dynamic braking in machines, such as, electric and diesel-electric locomotives, off-highway machines, and other heavy equipment, are well known. Electric drive motors generate current during the braking of the machine, and a resistor grid system includes a plurality of resistor elements to dissipate the generated electric power as heat. Thus, the resistor grid system may supplement the friction-based brakes and minimize the wear in friction-based braking components of the machine.

The capacity of a resistor grid to dissipate heat is limited by the maximum allowable temperature for parts of the resistor elements. Thus, the ability of a resistor grid system to dissipate heat may be reduced based on the component design of the system, ambient conditions surrounding the machine, and the altitude of machine operation. Failure to properly account for these variables may lead to failure of the resistor grid system or underutilization of full capacity the resistor grid system. Improved resistor grid system designs and control systems are needed to increase the longevity of resistive braking systems and to allow for maximum braking capacity under varied operating conditions.

SUMMARY

A first aspect provided herein relates to a system including a resistor grid comprising a plurality of resistor elements, the resistor grid electrically coupled to a motor of an electric drive machine; a temperature sensor positioned to measure a temperature of at least one of the plurality of resistor elements; a control circuit comprising one or more processors and memory structured to store instructions that, when executed by the one or more processors, cause the control circuit to: determine a temperature of the least one resistor element, according to measurements from the temperature sensor; and determine a resistive braking capacity of the resistor grid within a power capacity differential, according to the determined temperature of the resistor element; and a display configured to render a graphical representation of the resistive braking capacity of the resistor grid relative to the power capacity differential. In some embodiments, the temperature of the resistor element is the temperature of a resistor plate of the resistor element. In some embodiments, the temperature of the resistor element is the temperature of a resistor insulator of the resistor element. In some embodiments, the temperature sensor is a sensor that directly or indirectly measures a temperature. In other embodiments, the temperature sensor is one or more sensors or other data sources that provide secondary data sufficient for the one or more processors to determine the temperature of the at least one of the plurality of resistor elements.

In some embodiments, the power capacity differential spans between a peak power capacity and a continuous power capacity. In some embodiments, the system also includes a second temperature sensor configured to measure the temperature of an ambient air, wherein the control system is further configured to determine the resistive braking capacity of the resistor grid according to the measured temperature of the ambient air. In some embodiments, the ambient air temperature sensor is a sensor that directly or indirectly measures a temperature of the ambient air. In other embodiments, the ambient air temperature sensor is one or more sensors or other data sources that provide secondary data sufficient for the one or more processors to determine the ambient air temperature. In some embodiments featuring an ambient air temperature sensor, the control system is also configured to determine the continuous resistive capacity of the resistor grid according to at least one of the measured temperature of the ambient air and a density of the ambient air, and the display is further configured to render a graphical representation of the continuous resistive capacity of the resistor grid relative to the capacity differential.

In some embodiments, the control system is configured to determine a change in the temperature of the at least one resistor elements of the plurality of resistor elements and update the graphical representation of the resistive braking capacity according to the change in the temperature of the at least one resistor element. In some embodiments, the graphical representation comprises a first indication of a peak power capacity, a second indication of a continuous power capacity, and a third indication of the resistive braking capacity relative to the first indication and the second indication. In some embodiments, the graphical representation comprises a bar chart including, at a first end, the peak power capacity, and at a second end, the continuous power capacity, wherein a first portion including the first end is colored with a first color and a second portion including the second end is colored with a second color, and wherein the third indication comprises a line indicating a position of the resistive braking capacity relative to the first end and the second end.

A second aspect provided herein relates to a method of controlling an electric drive machine, the method comprising: determining, by one or more processors, a temperature of a resistor element of a resistor grid electrically coupled to a motor of an electric drive machine; determining, by the one or more processors, a resistive braking capacity of the resistor grid within a power capacity differential, according to the determined temperature of the resistor element; and rendering, by the one or more processors, a graphical representation of the resistive braking capacity of the resistor grid relative to the power capacity differential on a display of the electric drive machine. In some embodiments, the temperature of the resistor element is the temperature of a resistor plate of the resistor element. In some embodiments, the temperature of the resistor element is the temperature of a resistor insulator of the resistor element. In some embodiments, the temperature of the resistor element of a resistor grid is determined according to data provided by a temperature sensor. In other embodiments, the temperature of the resistor element of a resistor grid is determined according to data provided by one or more secondary sensors or other data sources that provide secondary data such as air temperature, pressure, flow rates, etc.

In some embodiments, the power capacity differential spans between a peak power capacity and a continuous power capacity. In some embodiments, the method further includes determining, by the one or more processors, an ambient air temperature, and determining, by the one or more processors, the peak power capacity of the power capacity differential according to the ambient air temperature. In some embodiments, the method includes determining, by the one or more processors, an ambient air density, wherein determining the peak power capacity is according to the ambient air temperature and the ambient air density.

In some embodiments, the method includes determining, by the one or more processors, the continuous resistive capacity of the power capacity differential according to at least one of the ambient air temperature and the ambient air density; and displaying the continuous resistive capacity to the operator of the electric drive machine. In some embodiments, the method includes determining, by the one or more processors, a change in the temperature of the resistor element; and updating, by the one or more processors, the graphical representation of the resistive braking capacity according to the change in the temperature.

In some embodiments, the graphical representation comprises a first indication of a peak power capacity, a second indication of a continuous power capacity, and a third indication of the resistive braking capacity relative to the first indication and the second indication. In some embodiments, the graphical representation comprises a bar chart including, at a first end, the peak power capacity, and at a second end, the continuous power capacity, wherein a first portion including the first end is colored with a first color and a second portion including the second end is colored with a second color, and wherein the third indication comprises a line indicating a position of the resistive braking capacity relative to the first end and the second end.

A third aspect provided herein relates to an electric drive machine including: a resistor grid comprising a plurality of resistor elements, the resistor grid electrically coupled to a motor of the electric drive machine; a temperature sensor arranged to measure a temperature of at least one of the plurality of resistor elements; a control circuit comprising one or more processors and memory structured to store instructions that, when executed by the one or more processors, cause the control circuit to: determine a temperature of the least one resistor elements, according to measurements from the temperature sensor; and determine a resistive braking capacity of the resistor grid within a power capacity differential, according to the determined temperature of the resistor element; and a display configured to render a graphical representation of the resistive braking capacity of the resistor grid relative to the power capacity differential. In some embodiments, the temperature of the resistor element is the temperature of a resistor plate of the resistor element. In some embodiments, the temperature of the resistor element is the temperature of a resistor insulator of the resistor element.

In some embodiments, the temperature sensor is a sensor that directly or indirectly measures a temperature. In other embodiments, the temperature sensor is one or more sensors that provide secondary data sufficient for the one or more processors to determine the temperature of the at least one of the plurality of resistor elements. In still other embodiments, the temperature sensor is one or more other data sources that provide secondary data sufficient for the one or more processors to determine the temperature of the at least one of the plurality of resistor elements.

In some embodiments, the power capacity differential spans between a peak power capacity and a continuous power capacity. In some embodiments, the electric drive machine also includes a second temperature sensor configured to measure the temperature of an ambient air, and the control system is further configured to determine the resistive braking capacity of the resistor grid according to the measured temperature of the ambient air. In some embodiments, the control system is further configured to determine the continuous resistive capacity of the resistor grid according to at least one of the measured temperature of the ambient air and a density of the ambient air, and the display is further configured to render a graphical representation of the continuous resistive capacity of the resistor grid relative to the capacity differential.

In some embodiments, the control system is further configured to determine the continuous resistive capacity of the resistor grid according to at least one of the measured temperature of the ambient air and a density of the ambient air, and wherein the display is further configured to render a graphical representation of the continuous resistive capacity of the resistor grid relative to the capacity differential.

In some embodiments, the graphical representation includes: a first indication of a peak power capacity, a second indication of a continuous power capacity, and a third indication of the resistive braking capacity relative to the first indication and the second indication.

In some embodiments, the graphical representation includes: a bar chart including, at a first end, the peak power capacity, and at a second end, the continuous power capacity, wherein a first portion including the first end is colored with a first color and a second portion including the second end is colored with a second color, and wherein the third indication comprises a line indicating a position of the resistive braking capacity relative to the first end and the second end.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Electric Drive Machine

Figure 1:
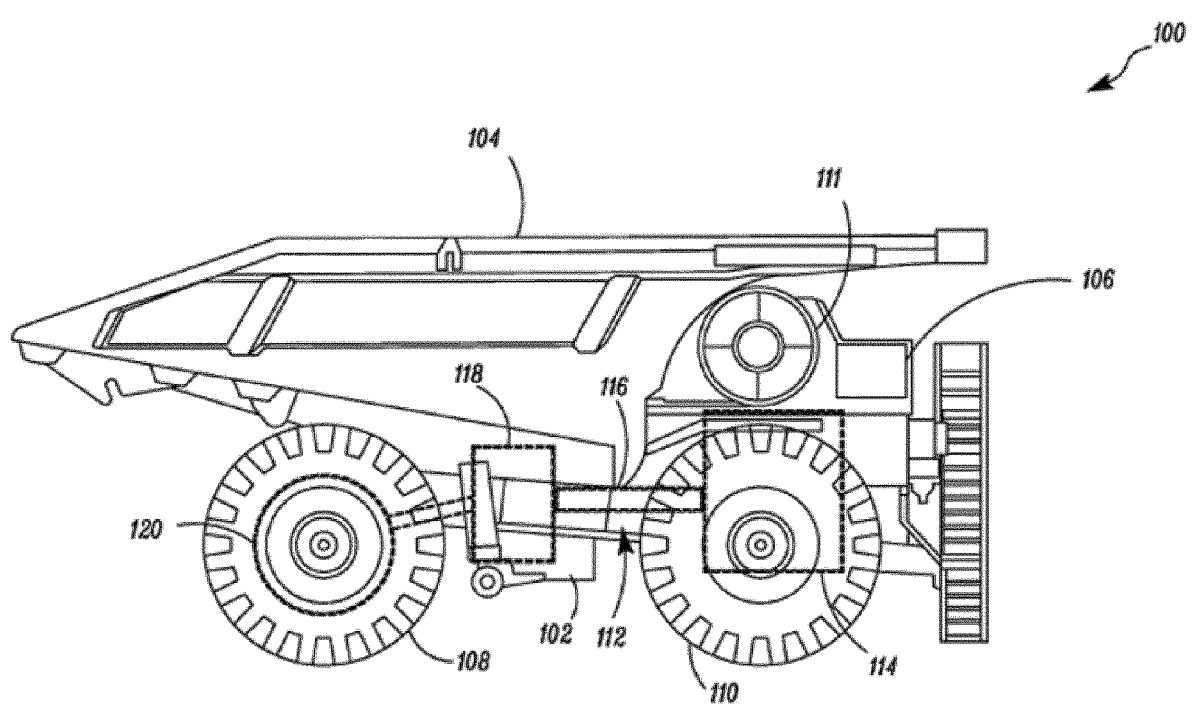
FIG. 1 is a side view of a machine, according to an embodiment of the present disclosure.

A machine 100 in which disclosed embodiments may be implemented is schematically illustrated in FIG. 1. The machine 100 may be generically described as any machine having an electric drive which may be connected to one or more drive wheels. The machine 100 may include a vehicle such as a diesel engine locomotive, a subway tram, an off-highway truck or a vehicle used in mining, construction, quarrying, and other applications. However, it will be apparent, any other vehicle having an electric drive or an electric-only arrangement may be included in the machine 100.

For the purpose of the present disclosure, in FIG. 1, the machine 100 is illustrated as an off-highway truck. The machine 100 may include a chassis 102 to support various components of the machine 100. The machine 100 may include a dump body 104 supported on the chassis 102. The chassis 102 may further support an operator cab 106 defined as an enclosure. An operator occupying the operator cab 106 may control various functions of the machine 100 by issuing various operator commands by means of controls such as a joystick, a lever, a touch-based user interface, or the like.

The machine 100 may further include a set of drive wheels 108 to propel the machine 100. In an embodiment, a set of idle wheels 110 may also be provided to steer the machine 100 in different directions. Further, the machine 100 may also include an articulated chassis for steering. Together, the set of drive wheels 108 and the set of idle wheels 110 may act as the ground engaging members for the machine 100. As illustrated in FIG. 1, the machine 100 also includes a modular resistor grid system 111 positioned adjacent to the operator cab 106 in the machine 100. However, it may be apparent, the modular resistor grid system 111 may be positioned anywhere based on the design and the available space in the machine 100.

The machine 100 of the present disclosure may be an electric machine having an electric drive 112. The electric drive 112 may provide the electric power to drive various components in the machine 100. In an embodiment, the electric power may be generated onboard by a generator, alternator, or another power-generation device, which may be driven by an engine or any other power source. Alternatively, the electric power may not be generated onboard but supplied externally from an overhead conductor via a pantograph trolley, a battery, a series of capacitors, or the like to drive the machine 100.

In the illustrated embodiment, the electric drive 112 includes a power source 114, which may be an engine, for example, an internal combustion engine such as a diesel engine, a gasoline engine, a natural gas engine or the like. The power source 114 may provide an output torque at an output shaft 116 in the machine 100. The output shaft 116 may be connected to a generator 118, which may be a multiple-phase alternating current (AC) synchronous alternator. During operation, the output shaft 116 rotates a rotor of the generator 118 to produce electric power, for example, in the form of alternating current (AC). This generated electric power may be used to run a plurality of drive motors 120 coupled directly or via intermediate assemblies to the set of drive wheels 108. For the purpose of the present disclosure, the drive motors 120 may be variable speed, reversible AC motors.

Electric Drive and Dynamic Breaking System

Figure 2:
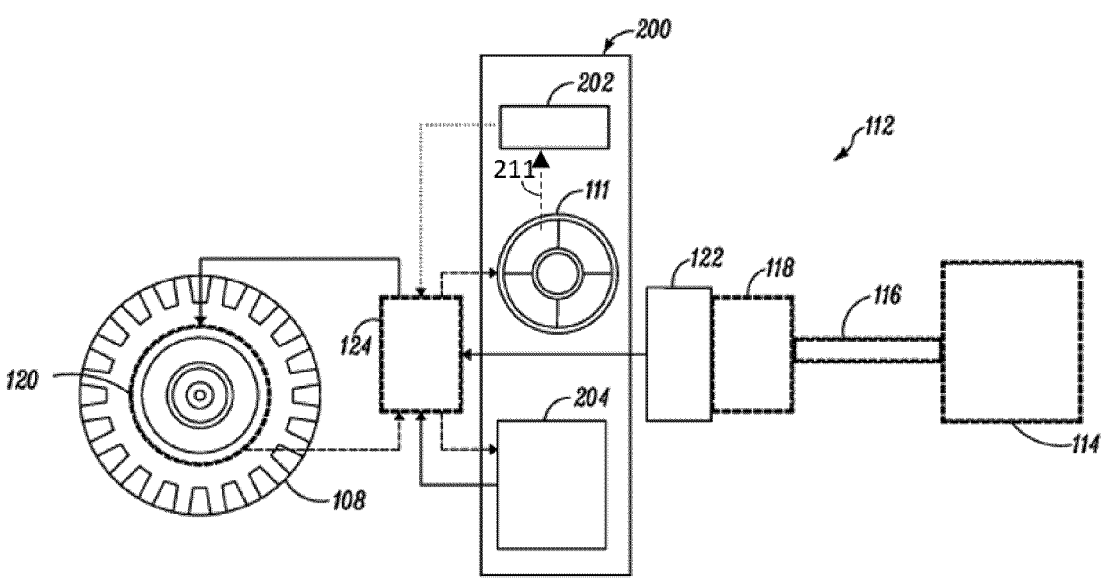
FIG. 2 is a schematic diagram of an electric drive for the machine of FIG. 1, according to an embodiment.

A schematic of the electric drive 112 is illustrated in FIG. 2. The electric drive 112 of the present disclosure may be a direct series drive. FIG. 2 illustrates an arrangement of various components of the electric drive 112 in the machine 100, according to an embodiment. In the schematic diagram, the flow direction of the electric power in the system is denoted by arrows. The solid-lined arrows denote the flow of the electric power when the machine 100 is being propelled. Conversely, the flow of the electric power during a braking mode of the machine 100 is denoted by dash-lined arrows in FIG. 2, while the dotted line arrow designates control line connection between components of the electric drive 112.

A person skilled in the art will understand that the generator 118 may produce electric power in the form of alternating current (AC) power. This electric power may be supplied to a rectifier 122 and converted to direct current (DC) power. The rectified DC power may be converted again to AC power by an inverter circuit 124. The inverter circuit 124 may be capable of selectively adjusting the frequency and/or pulse-width of the output, such that the drive motors 120 that are connected to an output of the inverter circuit 124 may be operated at variable speeds. In an embodiment, a plurality of inverter circuits 124 may be disposed in connection with the drive motors 120 in the machine 100.

FIG. 2 further illustrates a dynamic braking system 200 for the machine 100. The dynamic braking system 200 may be in connection with the drive motors 120 of the machine 100. Specifically, the dynamic braking system 200 may be operatively disposed in connection with the inverter circuit 124 in the machine 100. The dynamic braking system 200 may be configured to slow the propulsion of the machine 100 during braking mode as per an operator command in the machine 100.

According to the present disclosure, the dynamic braking system 200 may include a control unit 202, which may be a combination of, but not limited to, a hardware component, computing device, or other processing equipment, and memory, such as a Random Access Memory (RAM), a Read Only Memory (ROM), flash memory, a data structure, and the like. The control unit 202 may be configured to execute instructions (e.g., the processing equipment may be configured to execute the instructions stored on the data structure of the control unit 202). The control unit 202 may be configured to receive the operator command in the machine 100. Further, the control unit 202 may determine whether to put the machine 100 in the braking mode or not, based at least in part on the operator command. To initiate braking of the machine 100, the control unit 202 may generate a braking signal (illustrated by dotted line) for the inverter circuit 124. A dashed arrow represents optional signals, inputs, or data 211 that may be received by the control unit 202 from the resistor grid system 111 during operation.

The braking signal may be received by the inverter circuit 124 in the machine 100. The braking signal may carry instructions to reverse a torque polarity of the drive motors 120. This makes the drive motors 120 to act as generators, using the mechanical power in the form of rotational energy from the set of drive wheels 108 to produce electric power. This electric power may be supplied back to the electric drive 112 in the machine 100.

The dynamic braking system 200 may further be configured to provide regenerative braking in the machine 100. For this purpose, the dynamic braking system 200 may include an energy storage unit 204. The energy storage unit 204 may include a battery, a plurality of capacitors or the like disposed in connection with the drive motors 120 in the electric drive 112. As during braking mode, the drive motors 120 may produce electric power, the energy storage unit 204 may store this electric power for later use in the machine 100.

The present disclosure is applicable to many machines, for example, a large off-highway truck, such as a dump truck, which are commonly used in mines, construction sites and quarries. The machine 100 may have a high payload capability and a travel speed of a few miles per hour when fully loaded. The machine 100 may further be required to operate in a variety of environments, at a variety of altitudes, and to negotiate steep inclines in dry or wet conditions.

Typically, to halt or slow down such machines, friction-based brakes coupled to the set of drive wheels and idle wheels are used. These friction-based brakes are effective but may wear out with prolonged use. To overcome this, the dynamic braking system 200 of the machine 100 of the present disclosure may work in combination with or without these friction-based brakes. The dynamic braking system 200 may supplement these friction-based brakes in the machine 100 and thus helps in reducing the wear of such brakes.

The dynamic braking system 200 may act on the operator command to put the machine 100 in the braking mode. Specifically, the operator command may be received by the control unit 202 in the dynamic braking system 200. The control unit 202 generates the braking signal determined at least in part by the operator command. This determination or calculation may be based on various operating parameters of the machine 100, such as, the current speed, the current payload, the rate of acceleration, the desired speed and so forth.

Subsequently, the braking signal may be received by the inverter circuit 124 in the electric drive 112 of the machine 100. In the braking mode, the electric drive 112 may switch the torque polarity of the drive motors 120, which makes the drive motors 120 to act as generators. In this mode, the drive motors 120 may use the power from the set of drive wheels 108, which ultimately discharges the mechanical energy of the set of drive wheels 108 and achieves slowing or braking of the machine 100. Further, the drive motors 120, consuming the mechanical power from the set of drive wheels 108, may generate electric power in the electric drive 112.

This generated electric power may be fed to the dynamic braking system 200 in the electric drive 112. The generated electric power, which may be in the form of AC, may be fed via the inverter 124 which converts AC electric power into DC electric power. In an embodiment, with the machine 100 having regenerative braking, a part of the generated electric power may be supplied to the modular resistor grid system 111 to be dissipated as heat and the remainder of the generated electric power may be supplied to the energy storage unit 204 for later use in the machine 100.

Modular Resistor Grid System

Figure 3:
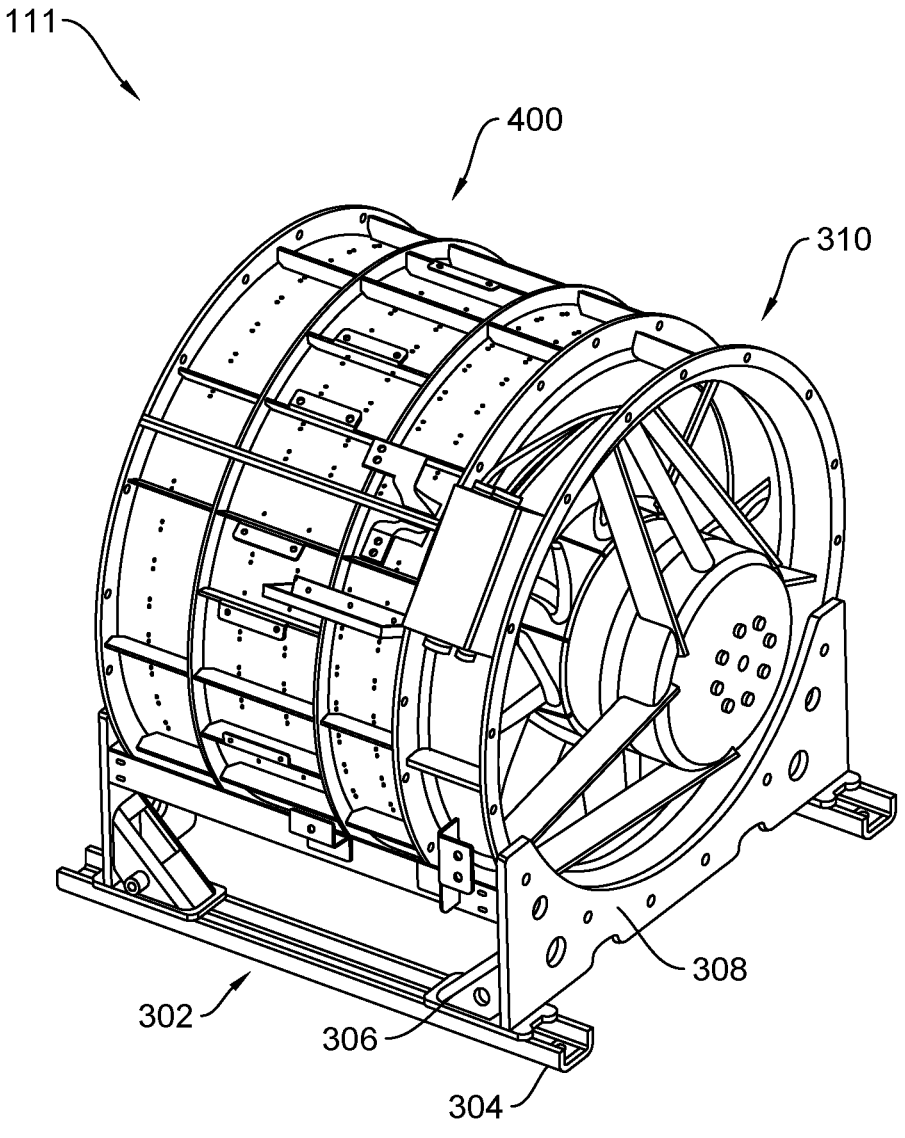
FIG. 3 is a perspective view of a modular resistor grid system, according to an embodiment.
Figure 4:
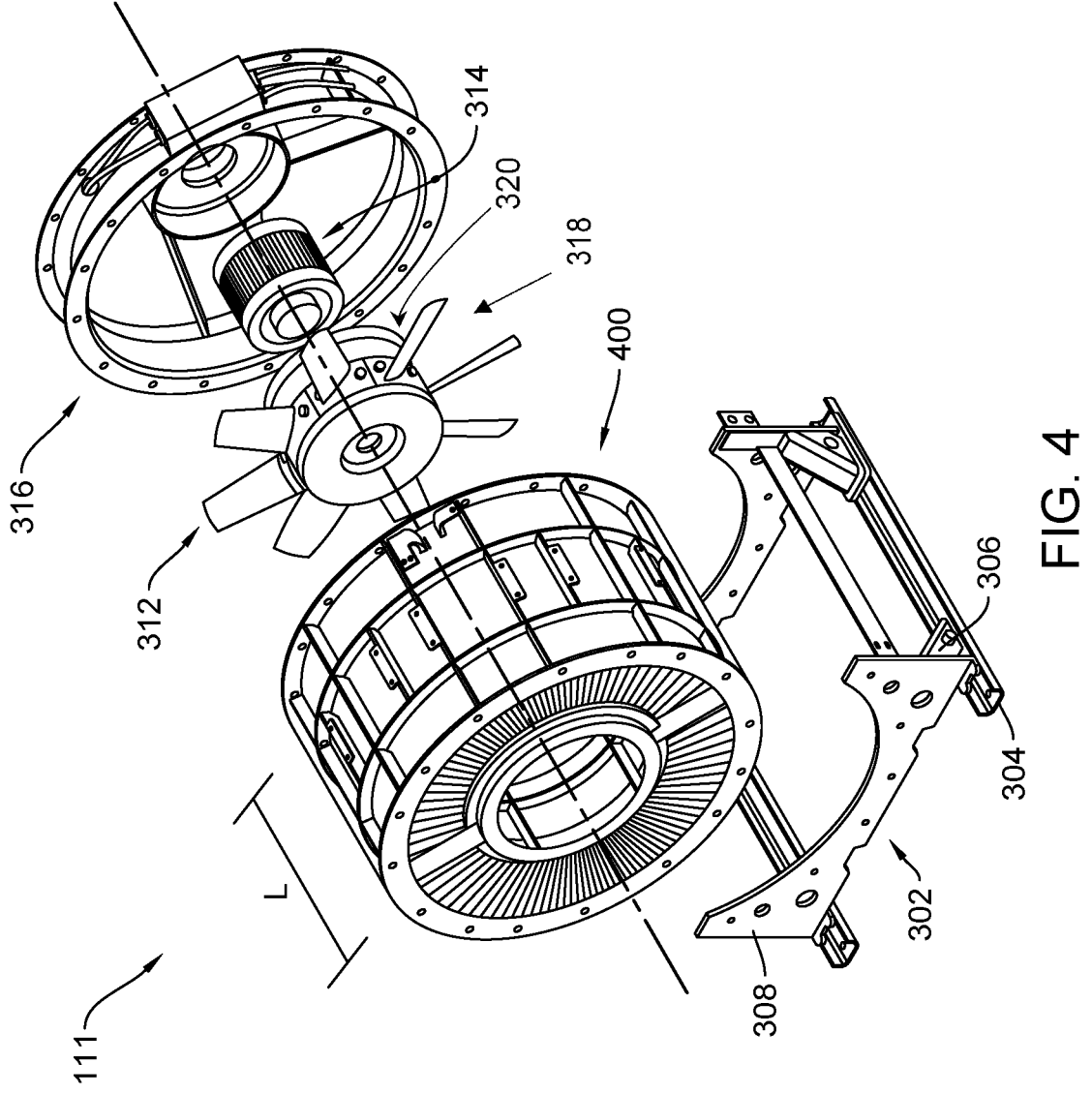
FIG. 4 is an exploded view of the modular resistor grid system of FIG. 3A.

The dynamic braking system 200 may include the modular resistor grid system 111. The modular resistor grid system 111 may dissipate some or all of the generated electric power in the form of heat. FIG. 3 illustrates a perspective view of the modular resistor grid system 111, according to an aspect of the present disclosure. FIG. 4 illustrates an exploded view of the modular resistor grid system of FIG. 3.

Referring to FIGS. 3 and 4, the modular resistor grid system 111 includes a mount 302, a fan 310, and a modular resistor grid assembly 400. The mount 302 may be permanently or removably coupled to the machine 100. The mount 302 provides a support structure upon which the other components of the modular resistor grid system 111 may be secured, connected, and/or coupled to the dynamic braking system 200 of the machine 100. The mount 302 may include a frame 304 and one or more brackets 306. The frame 304 may include rigid supporting members such as bars, rails, posts, tracks, or other suitable elements to affix the components of the modular resistor grid system 111 to the machine 100. The brackets 306 may be selectively moveable brackets 306 such that one or more brackets 306 can be fastened to a first position along the frame 304, loosened, allowed to slide along the length of the frame 304 to a second position, then tightened to secure the bracket 306 in the second position. The brackets 306 may also include a mounting feature 308 configured to align or abut with the components of the modular resistor grid system 111 such that the components may be fastened together by bolts, welds, or other suitable fasteners. For example, in FIGS. 3 and 4, moveable brackets 306 are coupled to mounting features 308 that are shaped to fit the cylindrical profile of the modular resistor grid system 111, according to an aspect of the present disclosure. In this way, multiple modular resistor grid assemblies 400 of varying axial length L may be coupled to the mount 302 by sliding and securing the moveable brackets 306 as needed along the frame 304.

The modular resistor grid system 111 also includes a fan 310. The fan 310 is configured to blow cooling air through the modular resistor grid assembly 400 in order to dissipate heat, for example, during a resistive braking mode of the machine 100. The fan 310 may include a blade assembly 312 configured to direct air towards or through the modular resistor grid assembly 400 as the blade assembly 312 rotates. A power source 314 (e.g., a motor, battery, etc.) may power the fan 310, and a hub assembly 316 may direct air towards the modular resistor grid assembly 400 and/or encase and protect the components of the fan 310.

The modular resistor grid system 111 includes a modular resistor grid assembly 400. The modular resistor grid assembly 400 facilitates resistive braking by receiving and dissipating power from the machine 100 in the form of heat. In some embodiments, the modular resistor grid assembly 400 may be formed by as a single unit or may be formed from a single modular resistor grid. In other embodiments, the modular resistor grid assembly 400 may be formed by coupling together multiple modular resistor grids 402 (See, e.g., FIGS. 5 and 6 discussed below). The modular resistor grid assembly 400 includes a housing 404 which may provide support to various elements of the modular resistor grid system 111. In the illustrated example of FIGS. 3-5, the housing 404 has a cylindrical shape having an inner wall 406 and an outer wall 408. The housing 404 may be in any shape and may divided into one or more modular sections. For example, the housing 404 of the modular resistor grid assembly 400 may be formed by coupling together two or more modular resistor grids 402, each having a housing 404 encasing one or more resistor elements 410. The modular resistor grids 402 may be cylindrical, semicylindrical, quadrant-shaped, wedge-shaped, triangular, or other suitable shapes. The number of subsections of housing 404 and the number of individual modular resistor grids 402 that may be coupled together to form the modular resistor grid assembly 400 may vary depending on the space constraints in the machine 100.

Figure 5:
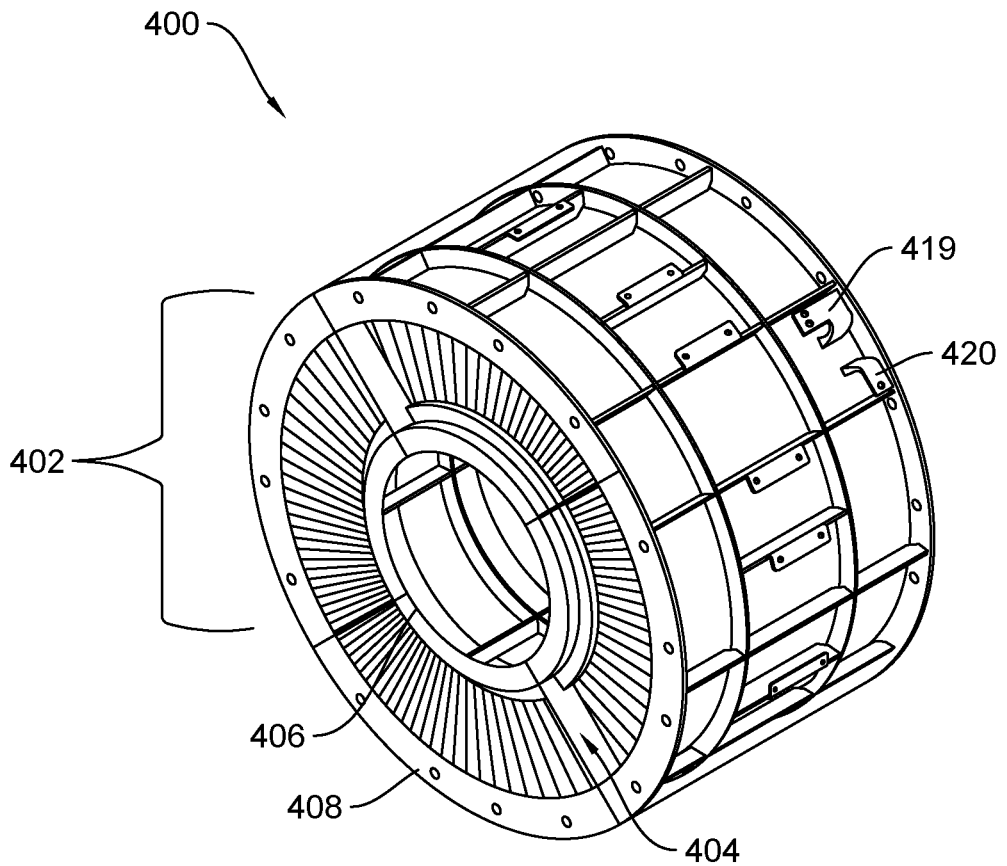
FIG. 5 is a perspective view of a modular resistor grid assembly, according to an embodiment.
Figure 6:
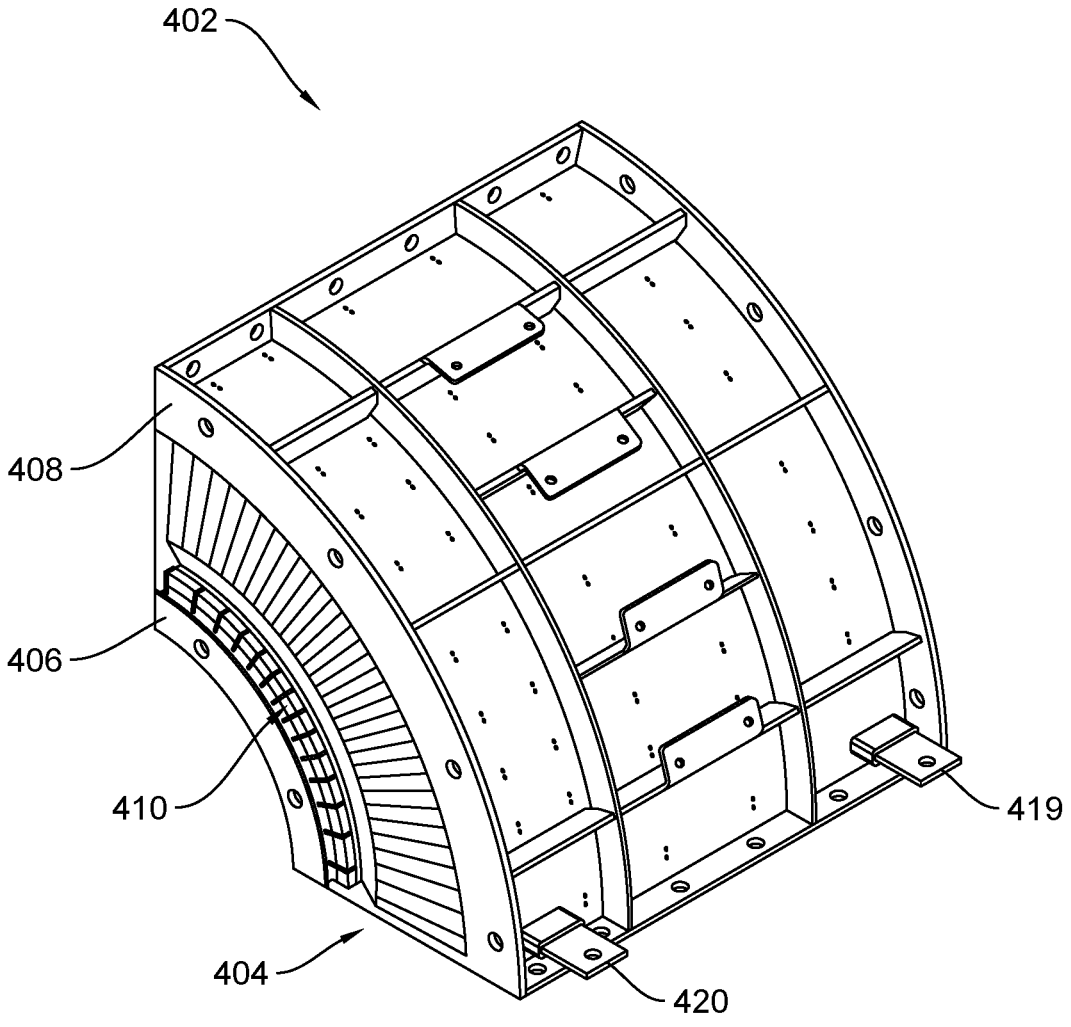
FIG. 6 is perspective view of a modular resistor grid of the modular resistor grid assembly of FIG. 5, according to an embodiment.

For example, FIG. 5 and FIG. 6 illustrate an embodiment of the modular resistor grid assembly 400 that is divided into four quadrant-shaped modular resistor grids 402, which are assembled with each other in the machine 100. The modular resistor grid assembly 400 and the modular resistor grid 402 include at least one resistor element 410 disposed between the inner wall 406 and the outer wall 408 of the housing 404. The modular resistor grid assembly and/or the modular resistor grid 402 may include two or more resistor elements 410 (e.g., a plurality of resistor elements 410) that are closely packed in a stacked configuration abutting in an end-to-end orientation. The resistor elements 410 may be uniformly arranged in the housing 404 to maintain air spaces between each other. This uniform spacing assures an adequate flow of cooling air between the resistor elements 410 in the modular resistor grid system 111. Moreover, one or more cooling air vents may be provided in the housing 404 for circulation of cooling air in the modular resistor grid system 111.

Figure 7:
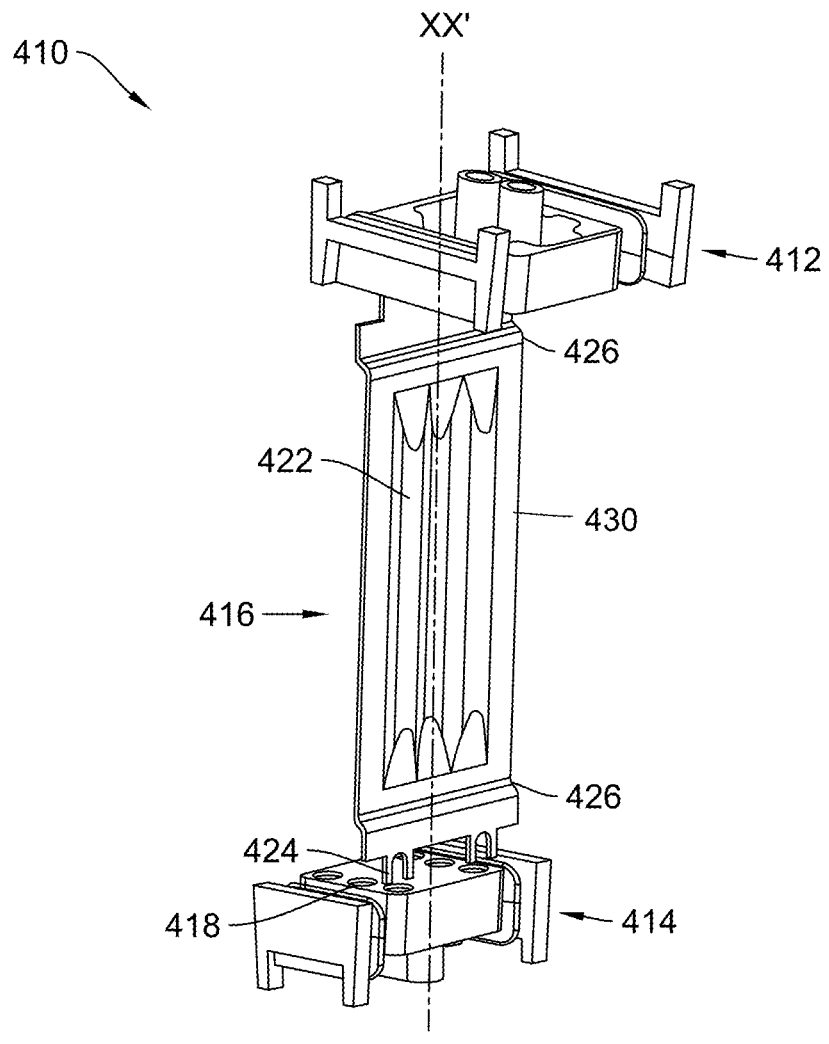
FIG. 7 is a perspective view of a resistor element, according to an embodiment.

FIG. 7 illustrates a resistor element 410 according to an embodiment. The resistor element 410 includes a first insulator 412, a second insulator 414, and one or more resistor plates 416 mounted to the first insulator 412 and the second insulator 414. In the example illustrated, the resistor plate 416 is mounted between the first insulator 412 and the second insulator 414, which in turn may be affixed to the inner wall 406 and the outer wall 408 of the housing 404 of the modular resistor grid assembly 400 and/or the modular resistor grid 402. Further, the one or more resistor elements 410 may be arranged in one or more rows, substantially parallel to each other in a close face-to-face relationship forming an axial airflow path therebetween. Multiple resistor plates 416 of the resistor element 410 may be connected in series within each modular resistor grid 402 and/or the modular resistor grid assembly 400 to provide a continuous current path between an input terminal 419 and an output terminal 420 (See FIGS. 5 & 6) of the modular resistor grid 402 and/or the modular resistor grid assembly 400. For this purpose, a conducting member may be disposed in the housing 404, electrically connecting the two or more resistor plates 416 in the modular resistor grid system 111. The conducting member may be a conductive wire, a weld, etc. The resistor units 410 may be connected in a manner such that the modular resistor grid system 111 may have two current circuits, a contactor power circuit and a chopper power circuit.

As illustrated, the first insulator 412 and the second insulator 414 may be in the shape of a block made of insulating material such as silicon bonded laminated mica, ceramic, glass reinforced material, etc. However, any other material with insulating properties may be used to form the first insulator 412 and the second insulator 414. The first insulator 412 may be affixed to the outer wall 408 of the housing 404 by some fastening member, such as, nuts and bolts, screws, etc. The second insulator 414 may be similarly fastened to the inner wall 406 of the housing 404. The first insulator 412 and the second insulator 414 may each include one or more apertures 418 formed therein. Further, the apertures 418 may not be extending through the first insulator 412 or the second insulator 414 and may be configured to receive and mount the resistor plate 416 between the first insulator 412 and the second insulator 414.

The resistor plate 416 may be formed from a continuous strip of resistive material such as stainless steel. The resistor plate 416 may include a body portion 430 extending along a longitudinal direction XX' of the resistor plate 416. In an embodiment, the resistor plate 416 may also include a series of reflexed portions 422 disposed at opposite longitudinal sides in the body portion 430 of the resistor plate 416. In some configurations, the resistor plate 416 may extend in the range of about 150 millimeters to about 200 millimeters along the longitudinal direction XX'. In a specific example, the resistor element 404 may have a length of about 160 millimeters. The resistor plate 416 may have a tip portion 424 disposed at an end 426 off the body portion 430. Alternatively, the resistor plate 416 may include two or more tip portions 424 disposed from both the ends 426. The tip portions 424 of the resistor plate 416 may be adapted to be received in the apertures 418 of the first insulator 412 and the second insulator 414. The apertures 418 may provide some clearance for movement of the tip portions 424 within. This allows for the resistor plate 416 to move in the longitudinal direction XX' in the resistor element 410 upon thermal expansion and thermal contraction.

During a resistive braking mode, the generated electric power may pass into the modular resistor grid system 111 via the input terminal 419 and flow through the resistor plates 416 in the resistor element 410 of the modular resistor grid system 111 to be dissipated as heat. Specifically, the heat is generated by the body portion 430 of the resistor plate 416. This generated heat may be radiated to the first insulator 412 and the second insulator 414 and raise the temperature of the first insulator 412 and the second insulator 414 in the resistor element 410. The normal continuous operating temperature for the first insulator 412 and the second insulator 414 is in the range of 300 to 400 degrees Celsius, according to industry standards. For short intervals, the temperature of the first insulator 412 and the second insulator 414 may reach higher values due to surges, but if the temperature rises above a critical or maximum operating temperature for extended periods of time, the lifetime of the first insulator 412 and the second insulator 414 may be greatly reduced. Further, the mechanical stability of the resistor plates 416 may be compromised, causing the resistor plates 416 to bend and ultimately leading to rapid failure of the dynamic braking system 200.

Temperature-Based Resistive Braking Capacity

With continued reference to FIG. 2-FIG. 7, during operation, the modular resistor grid system 111 has a capacity to dissipate energy that may be expressed as a power capacity. For example, the power capacity of the modular resistor grid system 111 may be 1 MW. The power capacity of the modular resistor grid system 111 may vary due to the geometry and properties of the resistor grid system, and on the operating conditions of the system. The power capacity of the resistor grid system 111 to dissipate energy may depend on, as non-limiting examples, the fan 310 operating conditions, the temperature of the ambient air, the density of the ambient air, the temperature of the resistor elements 410, and so forth.

The reported or measured power capacity of the modular resistor grid system 111 may be a continuous power capacity or a transient power capacity. The continuous power capacity of the resistor grid system 111 may be determined while the grid elements 410 are at the maximum sustainable temperature, $T_{max}$. The power capacity of the resistor grid system 111 may be limited by the maximum temperature, $T_{max}$, that can be safely sustained by the resistor elements 410, which may depend on the material and the geometry of the resistor elements. When operating in the continuous power capacity mode, the resistor grid system 111 operates with the resistor elements 410 at an approximately steady state temperature at or near $T_{max}$. In this mode, the resistor grid system 111 rejects energy as heat at about the same rate as energy is supplied to the system as an electrical charge. According to various implementations, the continuous power capacity of the resistor grid system 111 may depend on several variables, including, but not limited to, the length of the electrical pathway provided by the resistor elements, the resistor grid materials, the duty of the fan, and convection considerations such as the geometry of the angles and faces presented by the grid elements to the crossing air flow provided by the fan operation.

The transient power capacity may be present while the resistor grid system 111 operates with the grid elements 410 below the maximum operating temperature, $T_{max}$. While operating in this mode, the resistor grid system will transiently have increased power capacity available for absorbing and dissipating energy beyond what is available when operating in the continuous power mode. While operating in the transient mode, the resistor grid system 111 is able to dissipate an amount of energy approximately equal to the continuous power capacity, but is also able to absorb additional energy via heating of the resistor elements 410. The heat capacity of the system provides additional power capacity for resistive braking purposes.

The peak power capacity of the resistor grid system may occur when the resistor elements are at their lowest temperature. In an air-cooled system, the lowest resistor element temperature is equal to the temperature of the ambient air. A power capacity differential may exist in the system, which is defined by the peak power capacity and the continuous power capacity. By accounting for the additional power capacity available to the resistor grid when the resistor elements are below the maximum operating temperature, additional resistive braking capacity can be made available to a vehicle. This additional resistive capacity may be exploited by an operator, to reduce the amount of friction braking required to slow or otherwise control the vehicle. The systems and methods provided herein may permit an operator to take advantage of this additional resistive braking capacity.

Figure 8:
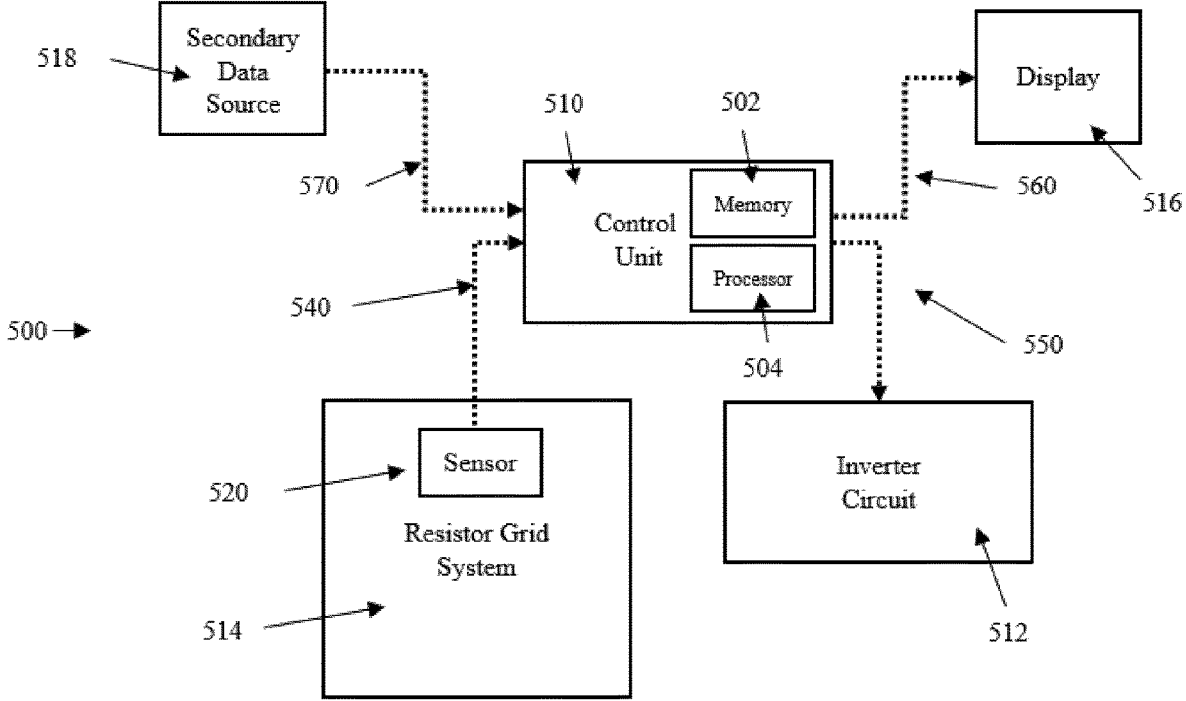
FIG. 8 is a schematic of a resistor grid system, according to an embodiment.

With reference to FIG. 8, a schematic diagram of a control circuit 500 for a resistive braking system is provided, according to an example implementation of the present disclosure. The control circuit 500 may account for the additional braking capacity available to a resistor grid when operating with the resistor elements below the maximum operating temperature of the components of the resistor elements (e.g., the resistor plates and/or the resistor insulators). The control circuit 500 may be configured to provide control of a resistive braking system of a vehicle including a power source, drive motors, an inverter, and a resistor grid system, as previously described, while receiving data regarding the operating temperature of parts or portions of the resistor grid system.

As shown in FIG. 8, the control circuit 500 may include a control unit 510, an inverter circuit 512, and a temperature sensor 520. The control circuit 500 includes one or more processors 504 and a computer memory 502. In some embodiments, the control circuit 500 includes a secondary data source 518 and/or a display 516 for displaying the resistive braking capacity of the resistor grid system to an operator of the vehicle. In some embodiments, the temperature sensor 520 is a sensor that directly or indirectly measures a temperature. In other embodiments, the temperature sensor 520 is one or more sensors or other data sources that provide secondary data sufficient for the one or more processors to determine the temperature of the at least one of the plurality of resistor elements. The control unit 510 may be a combination of, but not limited to, a set of instructions stored on a computer memory 502, one or more processors 504 configured to execute the set of instructions, a Random Access Memory (RAM), a Read Only Memory (ROM), flash memory, a data structure, and the like. The control unit 510 is configured to receive and output signals. The control circuit 500 is electrically coupled to a temperature sensor 520 configured to measure the temperature of one or more portions of the resistor grid system 514, such as the resistor grid elements.

The control unit 510 optionally may be configured to receive other signals 570 from secondary data sources 518. The secondary data sources may include, but not be limited to, remote or local databases or servers, computational models, processors, memory, and/or local or remote sensors. For example, the control unit 510 may receive a signal 570 corresponding to the temperature of the ambient air around the vehicle, the density of the ambient air around the vehicle, the elevation at which the vehicle is operating, the time of day, information regarding the planned route of the vehicle, and so forth. Even though a single source 518 is shown, it should be understood that each of these data signals could be provided by a separate sensor or other data source, such as a temperature sensor configured to measure the temperature of the ambient air around the vehicle or an altimeter configured to measure the elevation at which the vehicle is operating. It should also be understood that a single source may provide multiple data points. For example, a remote server may transmit a signal providing data on the elevation of the vehicle and the ambient air density or pressure.

The control unit 510 may be further configured to send a braking signal 550 to the inverter circuit 512. The braking signal may be received by the inverter circuit 512 in the vehicle. The braking signal may carry instructions to reverse a torque polarity of drive motors (not depicted) coupled to the inverter circuit 512, thereby providing braking to the vehicle and causing the drive motors to produce electrical charge. Excess electrical charge may be directed to the resistor grid system to be dissipated as heat or to a battery for storage.

In some embodiments, the temperature sensor 520 is, as non-limiting examples, a thermocouple, a digital temperature sensor, an infrared detector, a thermopile sensor, a resistance temperature detector, or a negative temperature coefficient thermistor. The temperature sensor provides a resistor temperature signal 540 corresponding to one or more temperatures associated with one or more resistor elements to the control unit 510. In some embodiments, the temperature sensor 520 is one or more sensors or other data sources that provide secondary data that enables the one or more processors to determine the temperature of the resistor grid elements. Measuring multiple resistor element locations will increase the redundancy of the data and may also help identify hot spots in the resistor grid. Such hot spots may be indicative of conduction or convection issues in the resistor grid. The temperature sensor may alternatively or additionally provide information corresponding to the temperature of other portions of the resistor grid system. For example, the temperatures of resistor insulators or grid covers may also be of interest and so can be measured.

The control unit 510 is configured to determine, using the one or more processors 504 and memory 502, the resistive braking capacity of the resistor grid system 514 according to the measured temperature data associated with the resistor grid system 514, as measured by the temperature sensor 520. The resistive braking capacity will fall within the power capacity differential, defined by the peak power capacity and the continuous power capacity of the resistor grid system 514. In some embodiments, the measured temperature is the temperature of one or more resistor elements. In other embodiments, the measured temperature is the temperature of a resistor plate of a resistor element. In some embodiments, the measured temperature is the temperature of other parts of the resistor grid system 514 such as resistor insulators, inner walls, or outer walls.

With continued reference to FIGS. 5-8, the control unit 510 optionally may be configured to determine the resistive braking capacity of the resistor grid system 514 according to other data available to it, such as the ambient air temperature, the ambient air density, the ambient air pressure, fouling of the resistor elements, the elevation at which the vehicle is operating, or the vehicle's planned route. This list of potential considerations is not intended to be exclusive— other variables may also be accounted for in determining the resistive braking capacity of the resistor grid system 514.

The control circuit 500 may optionally be configured to provide an output signal 560 to an interface 516. Information determined by, calculated by, derived by, identified by, or otherwise present in the control unit 510 can thus be transmitted by the output signal 560 to other devices 516. In some embodiments, the interface 516 is a user interface such as a graphical display. As a non-limiting example, a display may be positioned in the cab showing the capacity of the resistor grid to an operator of the vehicle, thus informing the operator of the availability of additional resistive braking capacity above the resistive braking capacity. In a non-limiting use-case scenario, an operator may wish to know how much capacity is available in the resistor grid braking system before beginning a downhill haul with the vehicle so as to avoid increased wear on the friction brake components of the vehicle. The control unit 510 may display the available resistive capacity to the operator along with indications of the continuous resistive capacity.

The graphical display includes an indication of the resistive braking capacity of the resistor grid system. It may also include an indication of the peak power capacity as determined by the control unit 510 using the one or more processors 504 and memory 502. In some embodiments, the determination of the peak power capacity accounts for either or both of the ambient air temperature and pressure. The rendered display may also indicate the continuous power capacity of the resistor grid system and the power capacity differential, which, in some embodiments, may also be determined accounting for either or both of the ambient air temperature and pressure. In other embodiments, the continuous power capacity is a set value in the computer memory 502 or received by the control unit 510 from another source 518. In some embodiments, the display includes colored portions to indicate the various information rendered. In some of these embodiments, colored bars indicate the relative values of the peak power capacity, the continuous power capacity, the resistive braking capacity, and the power capacity differential.

Figure 9:
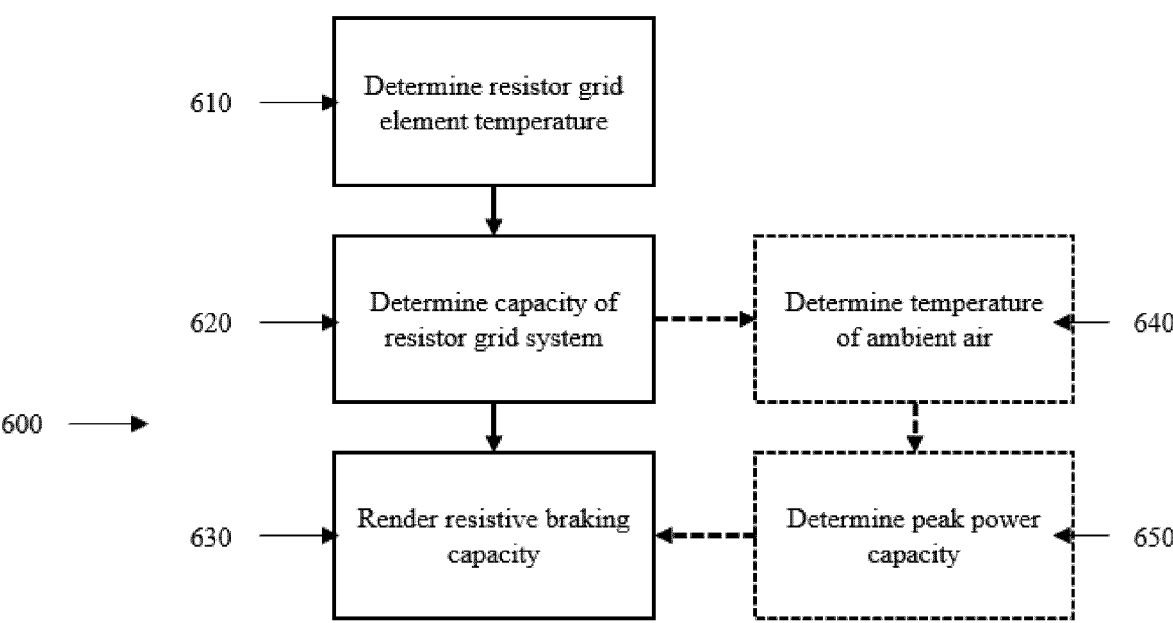
FIG. 9 is a schematic of a method of operating a resistor grid system, according to an embodiment.

These principles can be applied to a method of operating a vehicle with resistive braking capacity. With reference to FIG. 9, a method 600 of operating such a vehicle is shown according to an embodiment. In the first step 610, one or more processors on the vehicle may determine the temperature of at least one resistor element of a resistor grid system providing resistive braking capacity to the vehicle. As described above, in some embodiments, the temperature is measured by a sensor positioned near or inside the resistor grid system, and may include a thermocouple, a digital temperature sensor, an infrared detector, a thermopile sensor, a resistance temperature detector, or a negative temperature coefficient thermistor. In other embodiments, the temperature sensor may be one or more sensors or other data sources that provide secondary data that enables the one or more processors to determine the temperature of the resistor grid elements.

Once the temperature of the at least one resistor element is determined, in a second step 620, the one or more processors may determine the capacity of the resistor grid system according to the determine temperature of the resistor elements, relative to a power capacity differential. As described previously, the resistor grid system may have additional capacity above its continuous capacity when the temperature of the resistor elements are below the maximum operating temperature. The power capacity differential may, for example, extend from a peak or maximum power capacity (available when the temperature of the resistor grid elements are at about the ambient air temperature) and the continuous power capacity (available when the temperature of the resistor grid elements are at about maximum operating temperature).

Additional steps, shown in FIG. 9 in dashed lines, include a step 640 of determining the temperature of the ambient air in which the vehicle is operating. Also included is a step 650 of determining the peak power capacity of the resistor grid system according to the determined ambient air temperature. The peak power capacity of the resistor grid system may also be rendered by the one or more processors on a display available to an operator of the vehicle, thereby providing additional information to the operator regarding the potential capacity of the braking systems. Additionally, the density of the ambient air may also be taken into account by this method. In such a case, the peak power capacity of the resistor grid system accounts for the density of the ambient air before the information is rendered on the operator's display.

In a third step 630, the available resistive braking capacity of the vehicle is rendered by the one or more processors relative to the power capacity differential. This step may be performed using a display, preferably one that is readily available to an operator of the vehicle. For example, this step may utilize a display positioned within the cab of the vehicle for vehicles using local operators. For remote operators, the one or more processors may cause the resistive braking capacity to be rendered on a remote display. The power capacity differential, peak power capacity, and continuous power capacity may also be displayed, if so desired.

It should be understood that the method disclosed herein is not limited to exactly the steps shown in FIG. 9, nor must they be performed in the sequence as described. Multiple iterations of one step may be taken before or after another step is performed. In some embodiments, the determination of the ambient air temperature and the determination of the peak power capacity is not performed. In other embodiments, the determination of the ambient air temperature is performed, and the determination of the peak power capacity is not performed. In yet other embodiments, the determination of the ambient air temperature is not performed, and the determination of the peak power capacity is performed.

Various operations described herein can be implemented on computer systems. FIG. 8 shows a block diagram of a representative computing system comprising one or more processors 504 and a computer memory 502 usable to implement the present disclosure. The computing system can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. In some embodiments, the control unit 510 is the computing system. In other embodiments, the computing system is a portion or subsystem of the control unit 510. In some embodiments, the computing system may include conventional computer components such as one or more processors 504, storage device or computer memory 502, network interface, a user input device, and a user output device 516.

A network interface coupled to or otherwise in communication with the computer system can provide a connection to a wide area network (e.g., the Internet) to which WAN interface of a remote server system can also be connected. Network interface can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

A user input device can include any device (or devices) via which a user can provide signals to the computing system; computing system can interpret the signals as indicative of particular user requests or information. The user input device can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

A user output device 516 can include any device via which computing system can provide information to a user. For example, user output device 516 can include a display to display images generated by or delivered to computing system 516. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 516 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor can provide various functionality for the computing system, including any of the functionality described herein as being performed by a server or client, or other functionality associated with message management services.

It will be appreciated that the description of the computing system provided herein is illustrative and that variations and modifications to the configuration or implementation of the computer system are possible. Computer systems used in connection with the present disclosure can have other capabilities not specifically described here. Further, while the computing system is described with reference to particular blocks, it is to be understood that these blocks are defined for convenience of description and are not intended to imply a particular physical arrangement of component parts. For instance, different blocks can be located in the same facility, in the same server rack, on the same motherboard, or on the same circuitry. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various embodiments is illustrative only. Additionally, any element disclosed in one embodiment may be incorporated or utilized with any other embodiment disclosed herein.

What is claimed is:

1. A system comprising:
a resistor grid comprising a plurality of resistor elements, the resistor grid electrically coupled to a motor of an electric drive machine;
a temperature sensor arranged to measure a temperature of at least one of the plurality of resistor elements;
a control circuit comprising one or more processors and memory structured to store instructions that, when executed by the one or more processors, cause the control circuit to:
determine a temperature of the least one resistor element, according to measurements from the temperature sensor; and
determine a resistive braking capacity of the resistor grid within a power capacity differential, according to the determined temperature of the resistor element; and
a display configured to render a graphical representation of the resistive braking capacity of the resistor grid relative to the power capacity differential.

2. The system of claim 1, wherein the power capacity differential spans between a peak power capacity and a continuous power capacity.

3. The system of claim 2, wherein the control system is further configured to determine the continuous resistive capacity of the resistor grid according to at least one of the measured temperature of the ambient air and a density of the ambient air, and wherein the display is further configured to render a graphical representation of the continuous resistive capacity of the resistor grid relative to the capacity differential.

4. The system of claim 1, further comprising a second temperature sensor configured to measure the temperature of an ambient air, wherein the control system is further configured to determine the resistive braking capacity of the resistor grid according to the measured temperature of the ambient air.

5. The system of claim 2, wherein the control system is configured to determine a change in the temperature of the at least one resistor element of the plurality of resistor elements and update the graphical representation of the resistive braking capacity according to the change in the temperature of the at least one resistor element.

6. The system of claim 1, wherein the graphical representation comprises a first indication of a peak power capacity, a second indication of a continuous power capacity, and a third indication of the resistive braking capacity relative to the first indication and the second indication.

7. The system of claim 1, wherein the graphical representation comprises a bar chart including, at a first end, the peak power capacity, and at a second end, the continuous power capacity, wherein a first portion including the first end is colored with a first color and a second portion including the second end is colored with a second color, and wherein the third indication comprises a line indicating a position of the resistive braking capacity relative to the first end and the second end.

8. A method of controlling an electric drive machine, the method comprising:
determining, by one or more processors, a temperature of a resistor element of a resistor grid electrically coupled to a motor of an electric drive machine;
determining, by the one or more processors, a resistive braking capacity of the resistor grid within a power capacity differential, according to the determined temperature of the resistor element; and
rendering, by the one or more processors, a graphical representation of the resistive braking capacity of the resistor grid relative to the power capacity differential on a display of the electric drive machine.

9. The method of claim 8, wherein the power capacity differential spans between a peak power capacity and a continuous power capacity.

10. The method of claim 9, further comprising:

determining, by the one or more processors, an ambient air temperature; and determining, by the one or more processors, the peak power capacity of the power capacity differential according to the ambient air temperature.

11. The method of claim 10, further comprising determining, by the one or more processors, an ambient air density, wherein determining the peak power capacity is according to the ambient air temperature and the ambient air density.

12. The method of claim 11, further comprising:

determining, by the one or more processors, the continuous resistive capacity of the power capacity differential according to at least one of the ambient air temperature and the ambient air density; and displaying the continuous resistive capacity to the operator of the electric drive machine.

13. The method of claim 8, further comprising:

determining, by the one or more processors, a change in the temperature of the resistor element; and updating, by the one or more processors, the graphical representation of the resistive braking capacity according to the change in the temperature.

14. The method of claim 8, wherein the graphical representation comprises a first indication of a peak power capacity, a second indication of a continuous power capacity, and a third indication of the resistive braking capacity relative to the first indication and the second indication.

15. The method of claim 8, wherein the graphical representation comprises a bar chart including, at a first end, the peak power capacity, and at a second end, the continuous power capacity, wherein a first portion including the first end is colored with a first color and a second portion including the second end is colored with a second color, and wherein the third indication comprises a line indicating a position of the resistive braking capacity relative to the first end and the second end.

16. An electric drive machine comprising:

a resistor grid comprising a plurality of resistor elements, the resistor grid electrically coupled to a motor of the electric drive machine;

a temperature sensor arranged to measure a temperature of at least one of the plurality of resistor elements;

a control circuit comprising one or more processors and memory structured to store instructions that, when executed by the one or more processors, cause the control circuit to:

determine a temperature of the least one resistor element, according to measurements from the temperature sensor; and determine a resistive braking capacity of the resistor grid within a power capacity differential, according to the determined temperature of the resistor element; and a display configured to render a graphical representation of the resistive braking capacity of the resistor grid relative to the power capacity differential.

17. The electric drive machine of claim 16, wherein the power capacity differential spans between a peak power capacity and a continuous power capacity.

18. The electric drive machine of claim 17, wherein the control system is configured to determine a change in the temperature of the at least one resistor element of the plurality of resistor elements and update the graphical representation of the resistive braking capacity according to the change in the temperature of the at least one resistor element.

19. The electric drive machine of claim 16, further comprising a second temperature sensor configured to measure the temperature of an ambient air, wherein the control system is further configured to determine the resistive braking capacity of the resistor grid according to the measured temperature of the ambient air.

20. The electric drive machine of claim 19, wherein the control system is further configured to determine the continuous resistive capacity of the resistor grid according to at least one of the measured temperature of the ambient air and a density of the ambient air, and wherein the display is further configured to render a graphical representation of the continuous resistive capacity of the resistor grid relative to the capacity differential.

21. The electric drive machine of claim 16, wherein the graphical representation comprises a first indication of a peak power capacity, a second indication of a continuous power capacity, and a third indication of the resistive braking capacity relative to the first indication and the second indication.

22. The electric drive machine of claim 16, wherein the graphical representation comprises a bar chart including, at a first end, the peak power capacity, and at a second end, the continuous power capacity, wherein a first portion including the first end is colored with a first color and a second portion including the second end is colored with a second color, and wherein the third indication comprises a line indicating a position of the resistive braking capacity relative to the first end and the second end.

* * * * *